US011754403B2

(12) United States Patent
Nojiri

(10) Patent No.: US 11,754,403 B2
(45) Date of Patent: Sep. 12, 2023

(54) SELF-POSITION CORRECTION METHOD AND SELF-POSITION CORRECTION DEVICE

(71) Applicant: Nissan Motor Co., Ltd., Yokohama (JP)

(72) Inventor: Takahiro Nojiri, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/607,984

(22) PCT Filed: May 15, 2019

(86) PCT No.: PCT/JP2019/019411
§ 371 (c)(1),
(2) Date: Nov. 1, 2021

(87) PCT Pub. No.: WO2020/230314
PCT Pub. Date: Nov. 19, 2020

(65) Prior Publication Data
US 2022/0214173 A1 Jul. 7, 2022

(51) Int. Cl.
*G01C 21/28* (2006.01)
(52) U.S. Cl.
CPC .................. *G01C 21/28* (2013.01)
(58) Field of Classification Search
CPC .................................................. G01C 21/28
See application file for complete search history.

(56) References Cited

U.S. PATENT DOCUMENTS

| 2009/0119016 A1 | 5/2009 | Tanino et al. |
| 2013/0245933 A1* | 9/2013 | Castaneda ............... G01C 21/16 |
| | | 701/445 |
| 2016/0016606 A1* | 1/2016 | Tsubaki ............... B62D 5/0463 |
| | | 701/41 |
| 2017/0097642 A1 | 4/2017 | Okuya et al. |
| 2018/0120115 A1 | 5/2018 | Shikimachi et al. |
| 2018/0202814 A1 | 7/2018 | Kudrynski et al. |
| 2019/0137281 A1* | 5/2019 | Tateishi ................. G01C 21/28 |

(Continued)

FOREIGN PATENT DOCUMENTS

| EP | 3480560 A1 | 5/2019 |
| JP | H11-95837 A | 4/1999 |

(Continued)

*Primary Examiner* — Donald J Wallace
(74) *Attorney, Agent, or Firm* — Young Basile Hanlon & MacFarlane, P.C.

(57) ABSTRACT

A self-position correction method and/or a self-position correction device use a coordinate of the axis parallel to a front-rear direction of a vehicle as a longitudinal coordinate, calculate a corrected vehicle speed by adding a vehicle speed to a correction amount set based on a longitudinal correction amount obtained by subtracting a value of the longitudinal coordinate of a position of a target object detected by a detection unit from a value of the longitudinal coordinate of a position of a target object registered on a map data, and correct a position of the vehicle on the map data by estimating a position of the vehicle based on sequential integration of a calculated movement amount of the vehicle based on the corrected vehicle speed and a yaw rate of the vehicle.

5 Claims, 5 Drawing Sheets

(56) References Cited

U.S. PATENT DOCUMENTS

2020/0225044 A1* 7/2020 Tohriyama ............ G05D 1/0212
2020/0341470 A1* 10/2020 Maeda ............... G01C 21/3885

FOREIGN PATENT DOCUMENTS

| JP | 2009-115545 A | 5/2009 |
| JP | 2013-104861 A | 5/2013 |
| JP | 2016-218043 A | 12/2016 |
| JP | 2017-58235 A | 3/2017 |
| JP | 2018009833 A | 1/2018 |
| WO | WO-2018212302 A1 * | 11/2018 |

* cited by examiner

SELF-POSITION CORRECTION METHOD AND SELF-POSITION CORRECTION DEVICE

TECHNICAL FIELD

The present invention relates to a self-position correction method and a self-position correction device.

BACKGROUND

A vehicle position correction device is proposed, the vehicle position correction device calculates a position correction amount of a vehicle position by generating a position trajectory of a vehicle based on the vehicle position measured using a navigation satellite and comparing a shape of a traveling lane in which the vehicle is traveling and the position trajectory (see Japanese Patent Laid-Open Publication No. 2017-58235).

SUMMARY

The technique described in Japanese Patent Laid-Open Publication No. 2017-58235 corrects a position information indicating a current position of the vehicle on a map data by adding the position correction amount to the position information. Therefore, when correcting the position information of the vehicle controlled to travel on a predetermined track (for example, an autonomous driving vehicle), if the position correction amount is large, a steering angle of the vehicle is increased due to the correction of the position information, and thus, there is a problem of a risk of sudden changes and there is a problem of a risk of giving anxiety to the occupants. Sudden changes in steering angle due to such position correction are likely to occur, for example, when the vehicle is traveling on a curved road.

The present invention has been made in view of the above problems, and an object of the present invention is to provide a self-position correction method and a self-position correction device capable of correcting a position information of the vehicle, while suppressing sudden changes in steering angle due to correcting the position information of the vehicle.

In order to solve the above problems, a self-position correction method and/or a self-position correction device according to an aspect of the present invention use a coordinate of the axis parallel to a front-rear direction of a vehicle as a longitudinal coordinate, calculate a corrected vehicle speed by adding a vehicle speed to a correction amount set based on a longitudinal correction amount obtained by subtracting a value of the longitudinal coordinate of a position of a target object detected by a detection unit from a value of the longitudinal coordinate of a position of a target object registered on a map data, and correct a position of the vehicle on the map data by estimating a position of the vehicle based on sequential integration of a calculated movement amount of the vehicle based on the corrected vehicle speed and a yaw rate of the vehicle.

According to the present invention, it is possible to correct a position information of the vehicle controlled to travel on a predetermined track, while suppressing sudden changes in steering angle due to correcting the position information of the vehicle.

DETAILED DESCRIPTION

Figure 1:
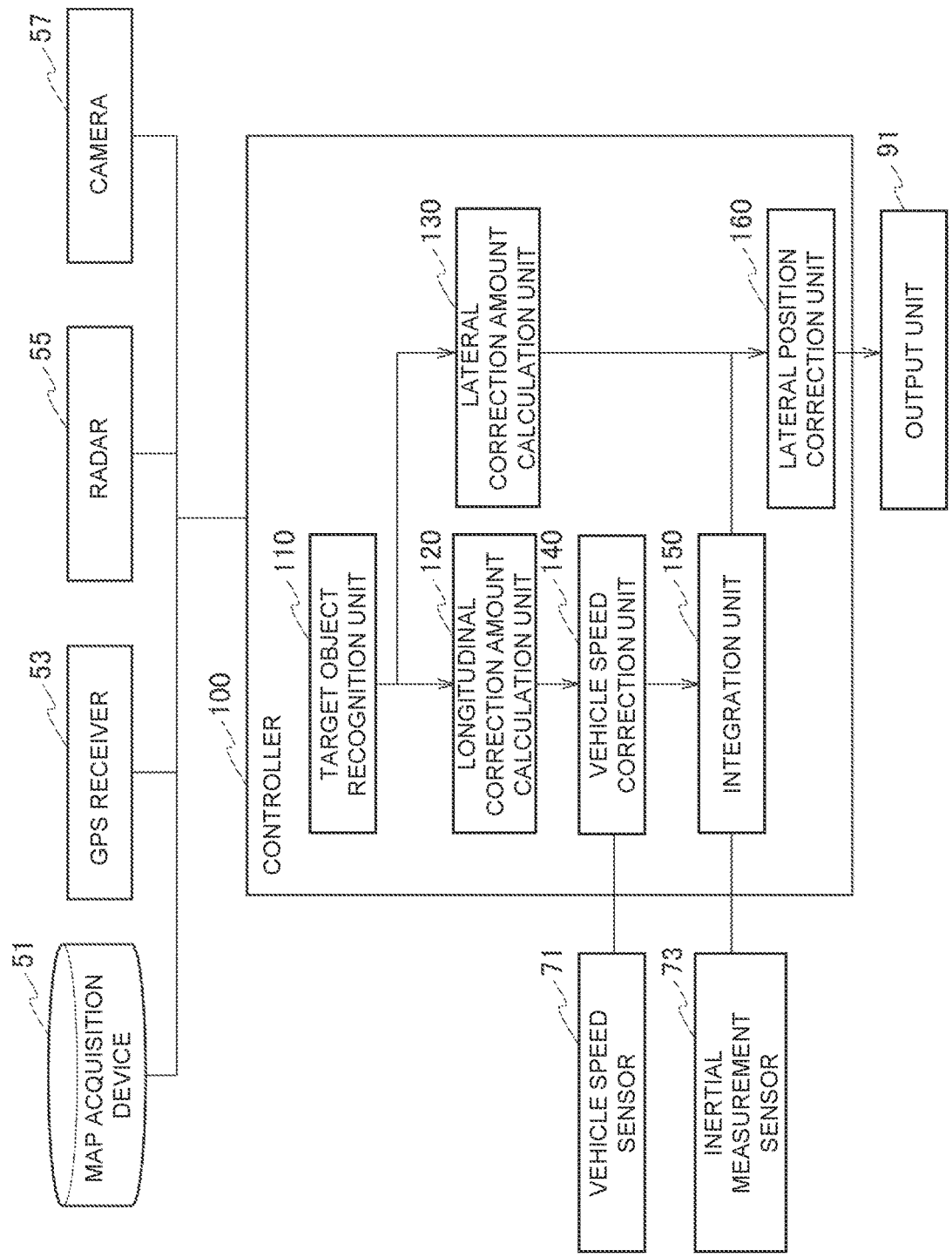
FIG. 1 is a block diagram illustrating a configuration of a self-position estimation device including a self-position correction device according to an embodiment of the present invention.

Next, embodiments of the present invention will be described in detail with reference to the drawings. In the description, the same items are designated by the same reference numerals and duplicate description will be omitted.

Configuration of Self-Position Correction Device

FIG. 1 is a block diagram illustrating a configuration of a self-position estimation device including a self-position correction device according to an embodiment of the present invention. As shown in FIG. 1, the self-position estimation device includes a map acquisition device 51, a GPS receiver 53, a radar 55, a camera 57, a vehicle speed sensor 71, an inertial measurement sensor 73, a controller 100, and an output unit 91.

Here, the GPS receiver 53, the radar 55, the camera 57, the vehicle speed sensor 71, and the inertial measurement sensor 73 are mounted on the vehicle. The map acquisition device 51, the controller 100, and the output unit 91 may be mounted on the vehicle or may be installed outside the vehicle. The map acquisition device 51, the GPS receiver 53, the radar 55, the camera 57, the vehicle speed sensor 71, the inertial measurement sensor 73, and the output unit 91 are connected to the controller 100 by a wired or wireless communication path.

The map acquisition device 51 acquires map data indicating a structure of the road on which the vehicle travels. The map data acquired by the map acquisition device 51 includes road structure information such as absolute lane positions, lane connection relationships, and relative positional relationships. Further, the map data acquired by the map acquisition device 51 may include facility information such as a parking lot and a gas station. In addition, the map data may include the position information of the traffic light, the type of the traffic light, and the like. The map acquisition device 51 may own a map database that stores map data or may acquire map data from an external map data server by cloud computing. Further, the map acquisition device 51 may acquire map data by using vehicle-to-vehicle communication and road-to-vehicle communication.

The GPS receiver 53 detects the position of the vehicle on the ground by receiving radio waves from a GPS (Global Positioning System) satellite.

The radar 55 emits radio waves toward the surroundings of the vehicle and measures the reflected waves to detect three-dimensional objects around the vehicle such as road signs and buildings.

The camera 57 takes an image of the surroundings of the vehicle and acquires an image in which a white line, a stop line, or the like around the vehicle is captured.

The GPS receiver 53, radar 55, and camera 57 are collectively referred to as a detection unit below. The examples given here are examples of the detection unit and are not limited to these examples. For example, the detection unit may be a Laser Imaging Detection and Ranging (LiDAR) (not shown).

The vehicle speed sensor 71 detects the vehicle speed of the vehicle. The vehicle speed sensor 71 may detect the vehicle speed from the rotation speed of the wheels of the vehicle or may detect the relative speed with respect to the road on which the vehicle travels by the Doppler effect or the like.

The inertial measurement sensor 73 includes an acceleration sensor that detects an acceleration applied to the vehicle, a rotational angular acceleration sensor and a gyro sensor that detects a rotational angular velocity of the vehicle, and a magnetic field sensor that detects an orientation of the vehicle. In particular, the inertial measurement sensor 73 detects a yaw rate of the vehicle.

The output unit 91 outputs a processing result of the controller 100, which will be described later. For example, the output unit 91 outputs the position of the vehicle after the self-position correction is performed to an automatic driving device (not shown).

The controller 100 (an example of a control unit or a processing unit) is a general-purpose microcomputer including a CPU (central processing unit), a memory, and an input/output unit. A computer program (self-position correction program) for functioning as a self-position correction device is installed in the controller 100. By executing the computer program, the controller 100 functions as a plurality of information processing circuits (110, 120, 130, 140, 150, 160).

Here, an example is shown in which a plurality of information processing circuits (110, 120, 130, 140, 150, 160) included in the self-position correction device are realized by software. However, it is also possible to configure information processing circuits (110, 120, 130, 140, 150, 160) by preparing dedicated hardware for executing each of the following information processing. Further, the plurality of information processing circuits (110, 120, 130, 140, 150, 160) may be configured by individual hardware. Further, the information processing circuit (110, 120, 130, 140, 150, 160) may also be used as an electronic control unit (ECU) used for other control related to the vehicle.

The controller 100, as a plurality of information processing circuits (110, 120, 130, 140, 150, 160), includes a target object recognition unit 110, a longitudinal correction amount calculation unit 120, a lateral correction amount calculation unit 130, a vehicle speed correction unit 140, an integration unit 150, and a lateral position correction unit 160.

The target object recognition unit 110 recognizes a target object that serves as a reference for determining the position of the vehicle, and calculates the relative positional relationship between the recognized target object and the vehicle.

An example of the target object recognition unit 110 is a position recognition unit based on the GPS receiver 53. In addition to this, the example of the target object recognition unit 110 may be a landmark recognition unit that detect a three-dimensional object (stationary object) around the vehicle such as a road sign or a building by a radar 55 or a Laser Imaging Detection and Ranging (LiDAR) (not shown), a white line recognition unit that recognizes a white line around the vehicle based on images captured by the camera 57, a stop line recognition unit that detects a stop line, or the like.

In the following, stationary targets such as white lines, stop lines, and other road signs around the vehicle, road signs, and three-dimensional objects around the vehicle, such as buildings, are referred to as target object.

In particular, the target object recognition unit 110 sets a coordinate of the axis parallel to a front-rear direction of a vehicle as a longitudinal coordinate and calculates a value of the longitudinal coordinate of a position of a target object detected by the detection unit as a first observed value. Further, the target object recognition unit 110 sets a coordinate of the axis parallel to the width direction of the vehicle as a lateral coordinate and calculates a value of the lateral coordinate of the position of the target object detected by the detection unit as a second observed value.

A coordinate system defined by the longitudinal coordinate and the lateral coordinate is called a vehicle coordinate system. The vehicle coordinate system is different from the map coordinate system used to represent the position information registered in the map data, but if the position and orientation of the vehicle in the map coordinate system and the position of the vehicle in the vehicle coordinate system are determined, the map coordinate system and the vehicle coordinate system can be related to each other by coordinate transformation (transformation by parallel translation and rotation). That is, by using the coordinate transformation, the position information represented by the map coordinate system can be converted into the position information in the vehicle coordinate system.

The longitudinal correction amount calculation unit 120 extracts the position information registered in the map data for the target object recognized by the target object recognition unit 110 from the map data acquired by the map acquisition device 51, performs the coordinate transformation for the extracted position information, and calculates a value of the longitudinal coordinate of the position of the recognized target object as a first registered value. Then, the longitudinal correction amount calculation unit 120 calculates a longitudinal correction amount by subtracting the first observed value from the first registered value.

Figure 3:
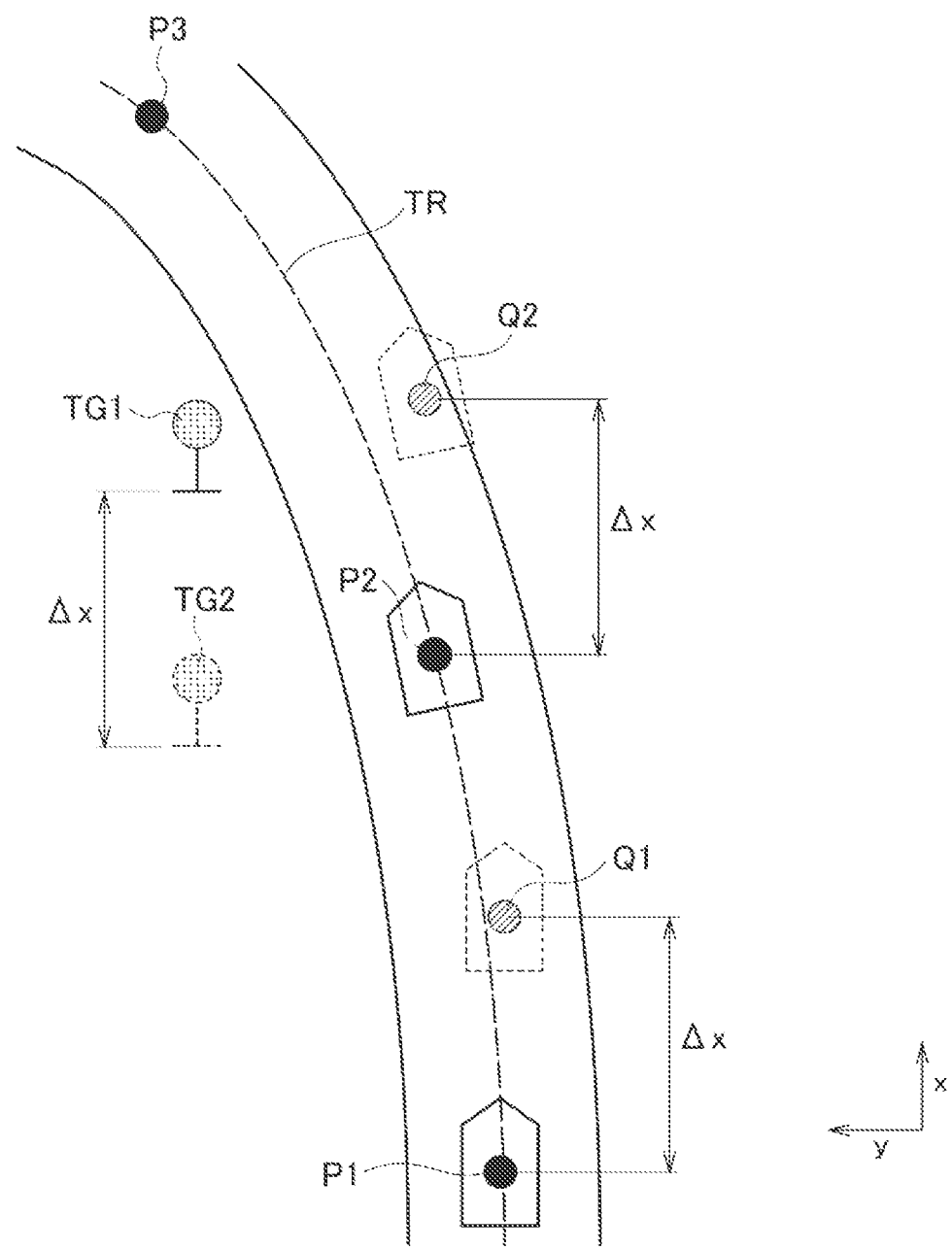
FIG. 3 is a schematic diagram illustrating a longitudinal correction amount regarding a position of the vehicle.

The calculation of the longitudinal correction amount is explained with reference to FIG. 3. FIG. 3 is a schematic diagram illustrating the longitudinal correction amount regarding the position of the vehicle. In FIG. 3, it is assumed that the vehicle is located at the point P1.

Here, it is assumed that the target object registered as being located at the position TG1 on the map data is recognized as being located at the position TG2 by the target object recognition unit 110. When comparing the position TG1 and the position TG2, the position TG2 is closer to the point P1 by $\Delta x$ in the longitudinal coordinate than the position TG1 in the vehicle coordinate system of the vehicle located at the position P1.

This means that an estimation that the vehicle is located at the point P1 includes an error, and in other words, this means that the vehicle is located at the point Q1 located advanced by $\Delta x$ in the longitudinal coordinate from the point P1 in the front direction of the vehicle (or in the traveling direction of the vehicle, in the x-axis direction in the figure). Therefore, $\Delta x$ is treated as the longitudinal correction amount for correcting the position P1 of the vehicle to the position Q1.

In addition, note the timing at which the longitudinal correction amount calculation unit 120 can calculate the longitudinal correction amount. Typically, the longitudinal correction amount is calculated at the timing when the target object located in front of or behind the vehicle can be recognized. However, the target object located in front of or behind the vehicle may not be recognized because it is shielded by another vehicle traveling around the vehicle. In such a case, the longitudinal correction amount cannot be calculated.

The lateral correction amount calculation unit 130 extracts the position information registered in the map data with respect to the target object recognized by the target object recognition unit 110 from the map data acquired by the map acquisition device 51, performs the coordinate transformation for the extracted position information, and calculates a value of the lateral coordinate of the position of the recognized target object as a second registered value. Then, the lateral correction amount calculation unit 130 calculates a lateral correction amount by subtracting the second observed value from the second registered value.

Figure 4:
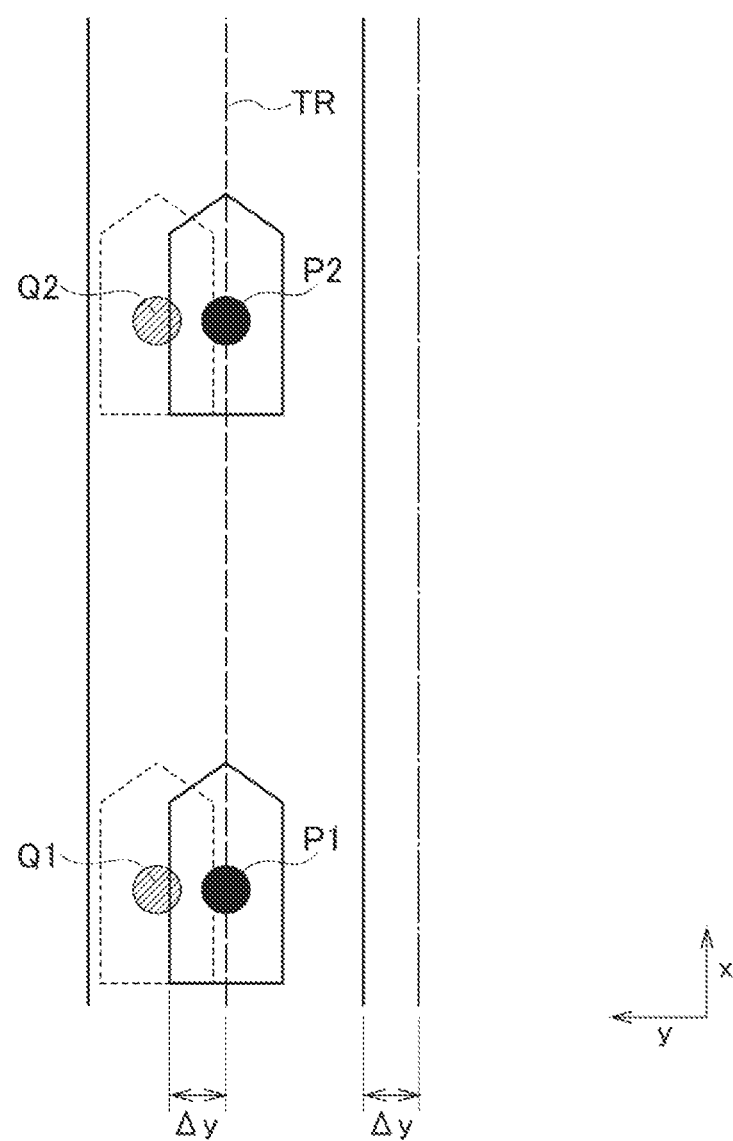
FIG. 4 is a schematic diagram illustrating a lateral correction amount regarding the position of the vehicle.

The calculation of the lateral correction amount is explained with reference to FIG. 4. FIG. 4 is a schematic diagram illustrating the lateral correction amount regarding the position of the vehicle. In FIG. 4, it is assumed that the vehicle is located at the point P1 located at the center TR in the width direction of the road.

Here, as a result of recognizing the white line of the road by the target object recognition unit 110, it is assumed that it is recognized that the white line exists at a position deviated by $\Delta y$ to the right along the width direction of the vehicle from the position registered in the map data.

This means that an estimation that the vehicle is located at the point P1 includes an error, and in other words, this means that the vehicle is located at the point Q1 located on the left side in the width direction of the vehicle by $\Delta y$ in the lateral coordinate from the point P1 (or in the y-axis direction in the figure). Therefore, $\Delta y$ is treated as the lateral correction amount for correcting the position P1 of the vehicle to the position Q1.

In addition, note the timing at which the lateral correction amount calculation unit 130 can calculate the lateral correction amount. Typically, the lateral correction amount is calculated at the timing when the target object located on the side of the vehicle can be recognized. Compared to the target object located in front of or behind the vehicle, it is rare that the target object located on the side of the vehicle is blocked by other vehicles traveling around the vehicle and cannot be recognized. Therefore, a number of the timings at which the lateral correction amount can be calculated tends to be larger than a number of the timing at which the longitudinal correction amount can be calculated.

In addition, in the case where there is a plurality of target objects recognized by the target object recognition unit 110, the longitudinal correction amount calculation unit 120 calculates the longitudinal correction amount for each recognized target object and calculates an average value of the plurality of longitudinal correction amounts as a typical longitudinal correction amount. Similarly, the lateral correction amount calculation unit 130 may calculate the lateral correction amount for each recognized target object, and may calculate the average value of the plurality of lateral correction amounts as a typical lateral correction amount.

The vehicle speed correction unit 140 sets a correction amount for the vehicle speed detected by the vehicle speed sensor 71 based on the longitudinal correction amount.

For example, the vehicle speed correction unit 140 may set the correction amount $\Delta v$, such that the larger the longitudinal correction amount $\Delta x$ is, the larger the value ($\Delta v/v$) is set, where the value ($\Delta v/v$) is obtained by dividing the correction amount $\Delta v$ for the vehicle speed by the vehicle speed v.

The vehicle speed correction unit 140 may set the correction amount $\Delta v$ such that $\Delta v/v$ increases stepwise as the longitudinal correction amount $\Delta x$ increases (For example, $\Delta v/v$ is set to 1% in the case where the longitudinal correction amount $\Delta x$ is less than a predetermined value, and $\Delta v/v$ is set to 10% in the case where the longitudinal correction amount $\Delta x$ is equal to or greater than the predetermined value, etc.).

The vehicle speed correction unit 140 may set $\Delta v$ so that $\Delta v/v$ continuously increases as the longitudinal correction amount $\Delta x$ increases.

Further, the correction amount $\Delta v$ may be set by multiplying the longitudinal correction amount $\Delta x$ by a positive predetermined coefficient $\alpha$ (that is, "$\Delta v = \alpha \cdot \Delta x$").

The vehicle speed correction unit 140 adds the correction amount set as described above to the vehicle speed detected by the vehicle speed sensor 71 to calculate the corrected vehicle speed.

The integration unit 150 estimates the position of the vehicle on the map data by using the dead reckoning method. That is, a movement amount (vector component) of the vehicle during a predetermined time interval is calculated based on the vehicle speed and yaw rate of the vehicle, and the calculated movement amount is sequentially integrated to estimate the position of the vehicle on the map data. That is, the integration unit 150 estimates the position of the vehicle on the map data at the current time by integrating the movement amount of the vehicle per unit time from the past time to the current time starting from the position of the vehicle at a certain past time.

In general dead reckoning, the movement amount of the vehicle is calculated based on the vehicle speed detected by the vehicle speed sensor 71 and the yaw rate of the vehicle detected by the inertial measurement sensor 73. On the other hand, in the integration unit 150 of the present embodiment, instead of using the vehicle speed detected by the vehicle speed sensor 71, the corrected vehicle speed calculated by the vehicle speed correction unit 140 is used to calculate the movement amount of the vehicle.

If the time interval is $\Delta t$, the movement amount of the vehicle is calculated using the corrected vehicle speed, so a correction amount "$\Delta v \cdot \Delta t$" is added to the movement amount for one time in the process of performing dead reckoning. When the correction amount "$\Delta v \cdot \Delta t$" added to each of the plurality of movement amounts calculated in the process of performing dead reckoning are added together, a magnitude of the added correction amounts approaches the longitudinal correction amount $\Delta x$ as the movement amounts are sequentially integrated. Therefore, after a sufficient number of movement amounts have been integrated by dead reckoning, the correction by the longitudinal correction amount $\Delta x$ is completed.

After the integration of the movement amount for one time is completed, the integration unit 150 subtracts the correction amount "$\Delta v \cdot \Delta t$" included in the movement amount for one time from the longitudinal correction amount to calculate the longitudinal correction amount after the subtraction. The longitudinal correction amount after the subtraction is used in the vehicle speed correction unit 140 to set the correction amounts from the next time onward.

In addition, in the case where the longitudinal correction amount is equal to or less than a predetermined threshold value, the integration unit 150 may add the longitudinal correction amount to a value of the longitudinal coordinate of the vehicle to correct the position of the vehicle. Here, the predetermined threshold value is determined in consideration of the level at which the sudden fluctuation of the steering angle caused by adding the longitudinal correction amount to a value of the longitudinal coordinate of the vehicle can be ignored by the occupant.

For example, in the case where the planned travel route of the vehicle is a straight line, even if the longitudinal correction amount is added to a value of the longitudinal coordinate of the vehicle to correct the position of the vehicle, the corrected position of the vehicle does not deviate significantly from the planned travel route. Therefore, in the case where a radius of curvature of the planned travel route of the vehicle is small, the above-mentioned predetermined threshold value may be set small, and in the case where the radius of curvature of the planned travel route of the vehicle is large, the above-mentioned predetermined threshold value may be set large.

The lateral position correction unit 160 adds the lateral correction amount to a value of the lateral coordinate of the vehicle to correct the position of the vehicle.

The correction of the position of the vehicle based on the lateral correction amount by the lateral position correction unit 160 is different from the correction of the position of the vehicle based on the longitudinal correction amount by the processing by the vehicle speed correction unit 140 and the integration unit 150. Specifically, the correction of the position of the vehicle based on the longitudinal correction amount corrects the vehicle speed, whereas the correction of the position of the vehicle based on the lateral correction amount is directly performed on the position of the vehicle.

As a number of the timings at which the lateral correction amount can be calculated tends to be larger than a number of the timing at which the longitudinal correction amount can be calculated, the correction of the position of the vehicle based on the lateral correction amount tends to be more frequently performed than the correction of the position of the vehicle based on the longitudinal correction amount. Thus, the lateral correction amount tends to be less likely to be large as compared with the longitudinal correction amount. Further, as the vehicle speed in the width direction of the vehicle is smaller than the vehicle speed in the front-rear direction of the vehicle, the lateral correction amount tends to be less likely to be large as compared with the longitudinal correction amount. Therefore, even if the position of the vehicle is corrected directly with respect to the position of the vehicle based on the lateral correction amount, the possibility that the steering angle suddenly changes is small.

Processing Procedure of the Self-Position Correction Device

Figure 2:
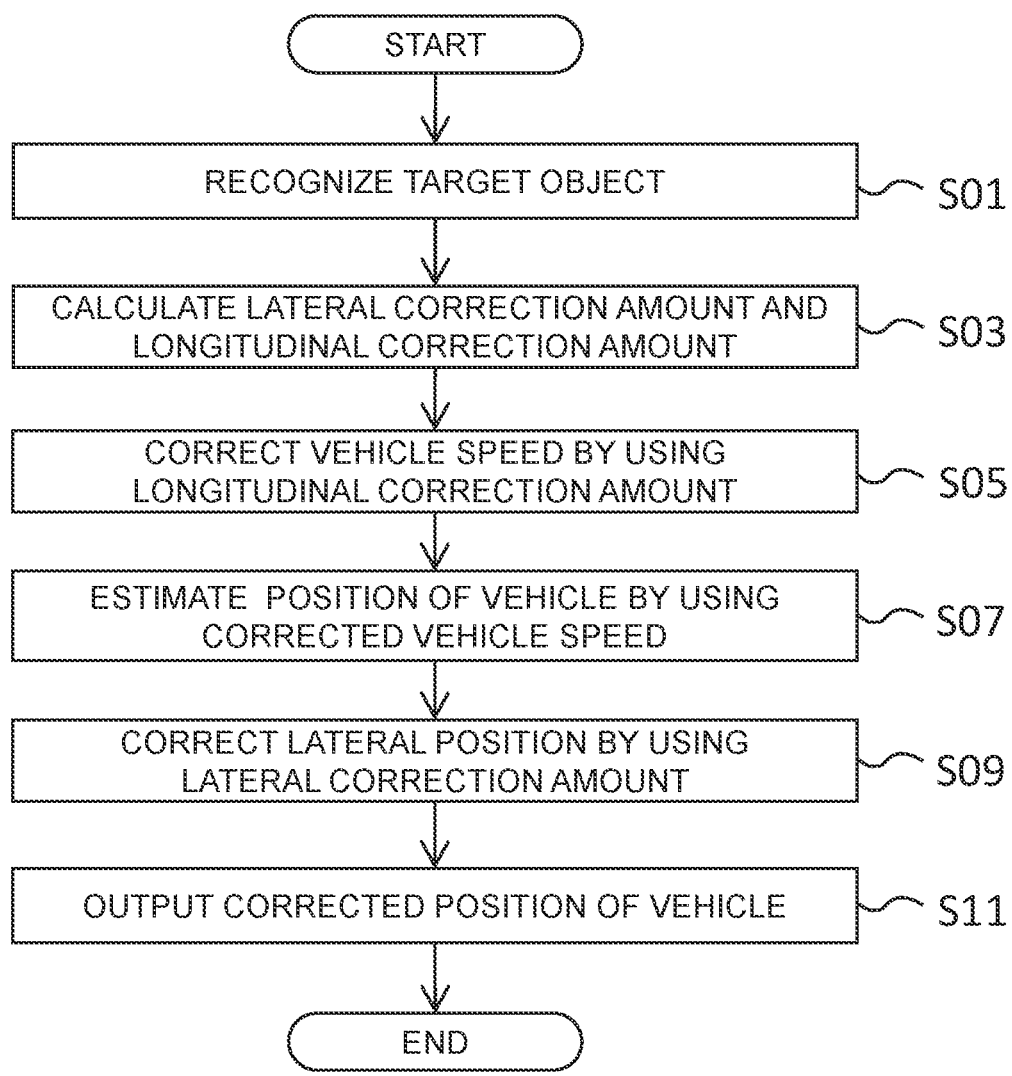
FIG. 2 is a flowchart illustrating a process procedure of a self-position correction according to the embodiment of the present invention.

A processing procedure of the self-position correction by the self-position correction device according to the present embodiment is explained next with reference to the flowchart of FIG. 2. The self-position correction process shown in FIG. 2 starts when the ignition of the vehicle is turned on and is repeatedly executed while the ignition is turned on.

In step S01, the target object recognition unit 110 recognizes a target object as a reference for determining the position of the vehicle and calculates the relative positional relationship between the recognized target object and the vehicle.

In step S03, the longitudinal correction amount calculation unit 120 calculates the longitudinal correction amount, and the lateral correction amount calculation unit 130 calculates the lateral correction amount.

In step S05, the vehicle speed correction unit 140 sets a correction amount for the detected vehicle speed based on the longitudinal correction amount, adds the correction amount to the detected vehicle speed, and calculates the corrected vehicle speed.

In step S07, the integration unit 150 calculates the movement amount of the vehicle using the calculated corrected vehicle speed, integrates the movement amount, and estimates the position of the vehicle.

In step S09, the lateral position correction unit 160 adds the lateral correction amount to a value of the lateral coordinate of the vehicle to correct the position of the vehicle.

In step S11, the output unit 91 outputs the position of the vehicle after the correction is performed.

Effect of Embodiment

As explained in detail above, during estimation of the position of the vehicle on the map data based on sequential integration of the movement amount of the vehicle, the self-position correction method and/or the self-position correction device according to the present embodiment use the coordinate of the axis parallel to the front-rear direction of the vehicle as the longitudinal coordinate, calculate the corrected vehicle speed by adding the vehicle speed to the correction amount set based on the longitudinal correction amount obtained by subtracting the value of the longitudinal coordinate of the position of the target object detected by the detection unit from the value of the longitudinal coordinate of the position of the target object registered on the map data, and correct the position of the vehicle on the map data by estimating the position of the vehicle based on sequential integration of the calculated movement amount of the vehicle based on the corrected vehicle speed and the yaw rate of the vehicle.

As a result, the longitudinal correction amount is not directly added to the longitudinal coordinate of the vehicle, so that sudden changes in the steering angle due to the position correction are suppressed. On the other hand, when performing dead reckoning, the correction amount is added to the longitudinal coordinate of the vehicle via the correction amount of the vehicle speed, and the magnitude of the added correction amounts approaches the longitudinal correction amount as the movement amounts are sequentially integrated. Thus, the position of the vehicle can be reliably corrected.

Figure 5:
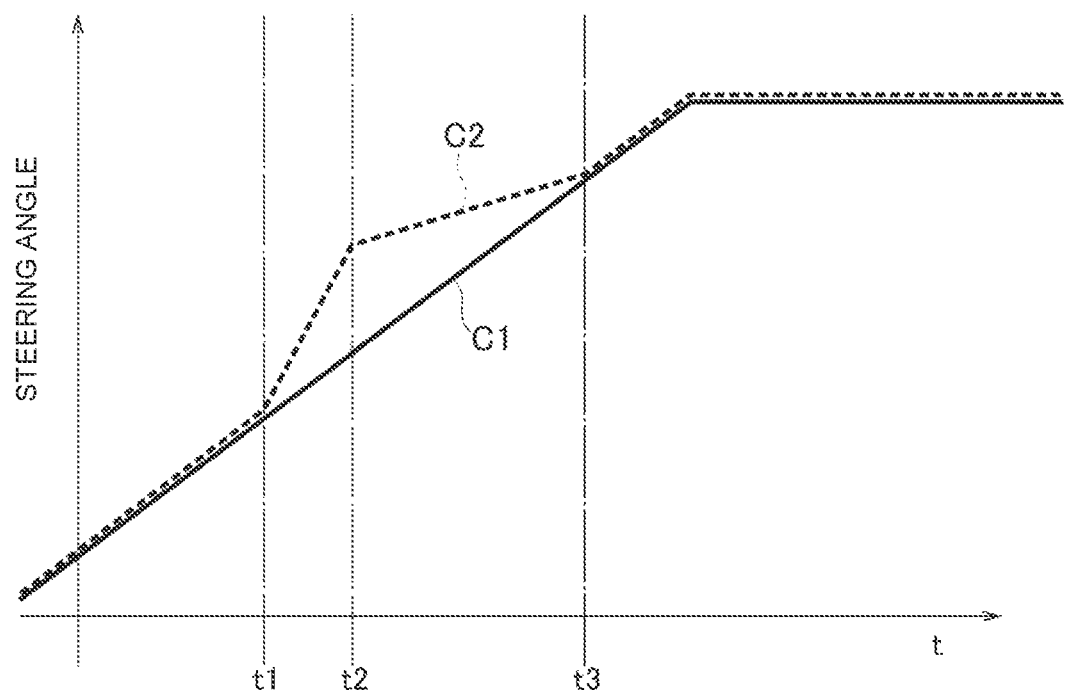
FIG. 5 is a schematic view illustrating changes in a steering angle of the vehicle on a curved road.

It can be explained by FIGS. 3 and 5 that sudden changes in steering angle are suppressed by adding the correction amount to the longitudinal coordinate of the vehicle via the correction amount of the vehicle speed instead of directly adding the longitudinal correction amount to the longitudinal coordinate of the vehicle. For example, as shown in FIG. 3, it is assumed that the vehicle is located at the point P1. It is assumed that the movement amount for one time in the process of performing dead reckoning is calculated based on the vehicle speed and yaw rate of the vehicle located at point P1, and it is assumed that the vehicle moves from point P1 to point P2 after a predetermined time interval.

Here, in the case where the longitudinal correction amount Δx is directly added to the longitudinal coordinate of the vehicle at the point P1 (i.e., in the case where all of the longitudinal correction amount Δx is added to the longitudinal coordinate of the vehicle in one step of dead reckoning), the position of the vehicle is corrected from the point P1 to the point Q1. However, since the movement amount for one time in the process of performing dead reckoning, which is calculated based on the vehicle speed and yaw rate of the vehicle located at point P1, is not corrected, it is calculated that the vehicle moves from point Q1 to point Q2 after the predetermined time interval. Here, the vector starting from the point P1 and ending in the point P2 and the vector starting from the point Q1 and ending in the point Q2 have the same magnitude and direction.

Therefore, in the case where the longitudinal correction amount Δx is directly added to the longitudinal coordinate of the vehicle at the point P1, if the longitudinal correction amount Δx is large, the corrected position of the vehicle becomes the point Q2 which significantly deviates from the route that the vehicle should originally travel (the route TR in FIG. 3), and there is a possibility that the steering angle may suddenly change as shown in the graph C2 of FIG. 5. FIG. 5 shows that the steering angle suddenly changes from time t1 to time t3 as a result of the correction of the longitudinal correction amount being performed at time t1. As shown in graph C2, the time change rate of the steering angle is discontinuous at time t1, time t2, and time t3.

On the other hand, in the case where the correction amount is added to the longitudinal coordinate of the vehicle via the correction amount of the vehicle speed, the longitudinal correction amount Δx is divided and added to the longitudinal coordinate of the vehicle in a plurality of steps of dead reckoning. Therefore, there is no possibility that the corrected position of the vehicle is significantly deviated from the route on which the vehicle should originally travel (the route TR in FIG. 3).

In the case where the correction amount is added to the longitudinal coordinate of the vehicle via the correction amount of the vehicle speed, the steering angle does not suddenly change as shown in the graph C1 of FIG. 5, and it is suppressed that the time change rate of the steering angle becomes discontinuous.

Further, the self-position correction method and/or the self-position correction device according to the present embodiment may set the value obtained by dividing the correction amount by the vehicle speed to be larger, as the larger the longitudinal correction amount. As a result, the larger the longitudinal correction amount is and the larger the vehicle speed is, the larger the vehicle speed correction amount is set. Thus, a time until the position of the vehicle is corrected can be shortened, while suppressing sudden changes in the steering angle due to the position correction. As a result, it is possible to correct the position of the vehicle within a shorter time compared to the case where the correction amount is set so that the value obtained by dividing the correction amount by the vehicle speed is constant regardless of the magnitude of the longitudinal correction amount.

Furthermore, the self-position correction method and/or the self-position correction device according to the present embodiment may set the correction amount by multiplying the longitudinal correction amount by the positive predetermined coefficient. As a result, the larger the longitudinal correction amount is, the larger the vehicle speed correction amount is set. Thus, it is possible to shorten the time until the position of the vehicle is corrected while suppressing sudden changes in the steering angle due to the position correction. Further, by adjusting the magnitude of the predetermined coefficient, it is possible to control the time until the position of the vehicle is corrected.

Further, the self-position correction method and/or the self-position correction device according to the present embodiment may add the longitudinal correction amount to the value of the longitudinal coordinate of the vehicle in the case where the longitudinal correction amount is equal to or less than a predetermined threshold value. As a result, if it is expected that fluctuation of the steering angle that occurs when the longitudinal correction amount is directly added to the longitudinal coordinate of the vehicle is sufficiently small compared to fluctuation level felt by the occupant, it is possible to correct the position of the vehicle directly based on the longitudinal correction amount, and the position of the vehicle can be corrected within a shorter time.

Furthermore, the self-position correction method and/or the self-position correction device according to the present embodiment may use the coordinate of the axis parallel to the width direction of the vehicle as the lateral coordinate, and may add the lateral correction amount to the value of the lateral coordinate of the vehicle, wherein the lateral correction amount is obtained by subtracting the value of the lateral coordinate of the position of the target object detected by the detection unit from the value of the lateral coordinate of the position of the target object registered on the map data. As a result, it is possible to correct the vehicle position based on the lateral correction amount with a smaller calculation load than the correction of the vehicle position based on the longitudinal correction amount. In addition, the position of the vehicle can be corrected in a short time based on the lateral correction amount.

Respective functions described in the above embodiment may be implemented by one or plural processing circuits. The processing circuits include programmed processing devices such as a processing device including an electric circuit and include devices such as an application specific integrated circuit (ASIC) and conventional circuit elements that are arranged to execute the functions described in the embodiment.

Although the contents of the present invention have been described above with reference to the embodiment, the present invention is not limited to these descriptions, and it will be apparent to those skilled in the art that various modifications and improvements can be made. It should not be construed that the present invention is limited to the descriptions and the drawings that constitute a part of the present disclosure. On the basis of the present disclosure, various alternative embodiments, practical examples, and operating techniques will be apparent to those skilled in the art.

It is needless to mention that the present invention also includes various embodiments that are not described herein. Therefore, the technical scope of the present invention is to be defined only by the invention specifying matters according to the scope of claims appropriately obtained from the above descriptions.

REFERENCE SIGNS LIST 51 map acquisition device
53 GPS receiver
55 radar
57 camera
71 vehicle speed sensor
73 inertial measurement sensor
91 output unit
100 controller
110 target object recognition unit
120 longitudinal correction amount calculation unit
130 lateral correction amount calculation unit
140 vehicle speed correction unit
150 integration unit
160 lateral position correction unit

The invention claimed is:

1. A method for correcting a position of a vehicle on a map data, which is estimated by sequential integration of a movement amount of the vehicle, based on a measurement result from a detector that detects a target object around the vehicle, while maintaining continuity of a time change rate of a steering angle of the vehicle, the method comprising:
using a coordinate of an axis parallel to a front-rear direction of the vehicle as a longitudinal coordinate;
setting a value of the longitudinal coordinate of a position of the target object registered in the map data as a first registered value;
setting a value of the longitudinal coordinate of a position of the target object detected by the detector as a first observed value;
using a coordinate of the axis parallel to a width direction of the vehicle as a lateral coordinate;
setting a value of the lateral coordinate of a position of the target object registered in the map data as a second registered value;
setting a value of the lateral coordinate of a position of the target object detected by the detector as a second observed value;
setting a correction amount based on a longitudinal correction amount obtained by subtracting the first observed value from the first registered value;
calculating a corrected vehicle speed by adding the correction amount to a vehicle speed of the vehicle;
calculating the movement amount of the vehicle based on the corrected vehicle speed and a yaw rate of the vehicle;
estimating a position of the vehicle by sequentially integrating the movement amount; and
controlling the vehicle to travel on a predetermined route based on the estimated position of the vehicle,
wherein the longitudinal correction amount is divided, and the divided longitudinal correction amounts are added to a value of the longitudinal coordinate of the vehicle over a plurality of steps in the sequential integration, and
wherein a lateral correction amount is obtained by subtracting the second observed value from the second registered value in each of the plurality of steps in the sequential integration and is added to a value of the lateral coordinate of the vehicle in each of the plurality of steps in the sequential integration.

2. The method according to claim 1, wherein a value obtained by dividing the correction amount by the vehicle speed is set to be greater as the longitudinal correction amount increases.

3. The method according to claim 1, wherein the correction amount is set by multiplying the longitudinal correction amount by a positive predetermined coefficient.

4. The method according to claim 1, wherein the longitudinal correction amount is added to a value of the longitudinal coordinate of the vehicle if the longitudinal correction amount is equal to or less than a predetermined threshold value.

5. A device for correcting a position of a vehicle on a map data, which is estimated by sequential integration of a movement amount of the vehicle, while maintaining continuity of a time change rate of a steering angle of the vehicle, the device comprising:
a detector configured to detect a target object around the vehicle; and
a controller configured to:
use a coordinate of an axis parallel to a front-rear direction of the vehicle as a longitudinal coordinate;
set a value of the longitudinal coordinate of a position of the target object registered in the map data as a first registered value;
set a value of the longitudinal coordinate of a position of the target object detected by the detector as a first observed value;
use a coordinate of the axis parallel to a width direction of the vehicle as a lateral coordinate;
set a value of the lateral coordinate of a position of the target object registered in the map data as a second registered value;
set a value of the lateral coordinate of a position of the target object detected by the detector as a second observed value;
set a correction amount based on a longitudinal correction amount obtained by subtracting the first observed value from the first registered value;
calculate a corrected vehicle speed by adding the correction amount to a vehicle speed of the vehicle;
calculate the movement amount of the vehicle based on the corrected vehicle speed and a yaw rate of the vehicle;
estimate a position of the vehicle by sequentially integrating the movement amount; and
control the vehicle to travel on a predetermined route based on the estimated position of the vehicle,
wherein the longitudinal correction is divided, and the divided longitudinal correction amounts are added to a value of the longitudinal coordinate of the vehicle over a plurality of steps in the sequential integration, and
wherein a lateral correction amount is obtained by subtracting the second observed value from the second registered value in each of the plurality of steps in the sequential integration and is added to a value of the lateral coordinate of the vehicle in each of the plurality of steps in the sequential integration.

* * * * *